US009166936B1

(12) United States Patent
Stovall et al.

(10) Patent No.: US 9,166,936 B1
(45) Date of Patent: Oct. 20, 2015

(54) MESSAGE CUSTOMIZATION

(71) Applicant: Parlant Technology, Inc., Provo, UT (US)

(72) Inventors: Daniel Bartholomew Stovall, Provo, UT (US); Thomas Edward Lane, Spanish Fork, UT (US); Stephen T. Jibson, Provo, UT (US)

(73) Assignee: Parlant Technology, Inc., Provo, UT (US)

( * ) Notice: Subject to any disclaimer, the term of this patent is extended or adjusted under 35 U.S.C. 154(b) by 10 days.

(21) Appl. No.: 14/315,762

(22) Filed: Jun. 26, 2014

(51) Int. Cl.
*G06F 15/16* (2006.01)
*H04L 12/58* (2006.01)

(52) U.S. Cl.
CPC .................................... *H04L 51/00* (2013.01)

(58) Field of Classification Search
USPC ......................................... 709/206, 217–219
See application file for complete search history.

(56) References Cited

U.S. PATENT DOCUMENTS

| | | | |
|---|---|---|---|
| 7,715,032 B2 | 5/2010 | Bird et al. | |
| 7,865,394 B1 * | 1/2011 | Calloway et al. | 705/14.4 |
| 8,639,223 B1 * | 1/2014 | Hu | 455/412.1 |
| 2005/0276257 A1 * | 12/2005 | Godwin et al. | 370/349 |
| 2008/0300962 A1 | 12/2008 | Cawston et al. | |
| 2008/0301561 A1 | 12/2008 | Bain | |
| 2010/0169434 A1 * | 7/2010 | Lind et al. | 709/206 |
| 2010/0199171 A1 | 8/2010 | Grosso | |
| 2010/0306322 A1 | 12/2010 | Conahan | |
| 2011/0213670 A1 * | 9/2011 | Strutton et al. | 705/14.73 |
| 2011/0238456 A1 | 9/2011 | Ray et al. | |
| 2013/0007143 A1 | 1/2013 | Rinard et al. | |
| 2013/0007195 A1 | 1/2013 | Rinard et al. | |
| 2013/0024492 A1 | 1/2013 | Graff et al. | |
| 2013/0024524 A1 * | 1/2013 | Graff et al. | 709/206 |
| 2013/0086188 A1 * | 4/2013 | Mays et al. | 709/206 |
| 2013/0282421 A1 | 10/2013 | Graff et al. | |
| 2014/0074896 A1 | 3/2014 | Bushman | |

OTHER PUBLICATIONS

"Bulk messaging", retrieved from <<http://en.wikipedia.org/wiki/Bulk_messaging, May 4, 2014, 2 pages.

(Continued)

*Primary Examiner* — Abdullahi E Salad
(74) *Attorney, Agent, or Firm* — Ogilvie Law Firm

(57) ABSTRACT

A communications hub receives a messaging job creation request sent over a network connection. The messaging job creation request includes a destinations uniform resource locator ("URL") plus an inline contents list containing content specifiers, a contents URL plus an inline destinations list containing recipient specifiers, or a destinations URL plus a contents URL. The destinations URL identifies a list of recipient specifiers, each with a delivery address and mode. The contents URL identifies content specifiers for content to be delivered. Some recipient specifiers include merge fields for merging values into message contents. The contents URL itself may include a merge field for merging to obtain a merged contents URL which then identifies a content specifier location. The URLs and the merge fields can appear in various combinations, thereby supporting flexible message customization without hindering bulk messaging.

30 Claims, 3 Drawing Sheets

(56) References Cited

OTHER PUBLICATIONS

"Callback URLs Explained", retrieved from <<http://www.alertra.com/blog/2011/callback-urls-explained/, Dec. 12, 2011, 3 pages.
"REST and SOAP: When Should I Use Each (or Both)?", retrieved from <<http://www.infoq.com/articles/rest-soap-when-to-use-each, Apr. 1, 2010, 21 pages.
"What is a Merge Code?", retrieved from <<https://surveygizmo.helpgizmo.com/help/article/link/merge-codes, Mar. 3, 2014, 27 pages.
"How to send bulk SMS with twilio API", retrieved from <<http://stackoverflow.com/questions/19418801/how-to-send-bulk-sms-with-twilio-api>>, Oct. 17, 2013, 2 pages.
"What are the limits on outbound calls and SMS messages per-second?", retrieved from <<http://www.twilio.com/help/faq/twilio-basics/what-are-the-limits-on-outbound-calls-and-sms-messages-per-second>>, © 2009—2014, 2 pages.
"Training Manual [for] Parentlink [dba of applicant Parlant Technology, Inc.]", Winter 2010, 41 pages.
"Twilio Doc—REST API", retrieved from <<www.twilio.com/docs/api/rest>>, Apr. 1, 2010, 535 pages.

* cited by examiner

MESSAGE CUSTOMIZATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Schools, businesses, government agencies, and other entities often find it necessary and/or desirable to provide informational messages and alerts to certain individuals and groups of individuals. Such messaging may be done to communicate relevant information regarding operational and policy decisions that affect the individual or group or their relationship with the sender of the message or alert. For example, it is a commonplace activity for many businesses, government agencies, schools, churches, clubs, associations, and other groups to provide messages to an individual or group of individuals with informational updates, details for upcoming events, changes to scheduled events, policies and procedures, reports and results of activities, and so on.

In some school districts, administrators recognize that certain teachers tend to send more messages to parents reporting on undesirable student behavior than messages reporting on desirable student behavior. Many schools and school districts also recognize that increasing the number of positive student behavior messages compared to the number of negative student behavior messages helps foster a better relationship between the school and parents, which in turn aids student learning. Accordingly, it may be desirable to increase the ratio of positive student behavior communications to negative student behavior communications.

A wide variety of systems and processes exist for providing messages and alerts to individuals and groups of individuals. These include both manual and automated systems, with many computerized messaging systems now being offered by various companies. Computerized messaging systems can be used to generate messages in forms such as email, voicemail, or short texts, which are then sent to one or more interested individuals or groups of individuals.

Many organizations and agencies, including commercial businesses, governments, and schools, have adopted and implemented computerized messaging systems, with varying degrees of success. Some computerized messaging systems provide little opportunity for customization. However, since the communication of timely and effective messages is important to many organizations, these computerized messaging systems have been broadly adopted in many locations and environments despite their inflexibility.

While the ability to efficiently and effectively create and send messages and alerts is often desirable, some issues are associated with the adoption and implementation of computerized messaging systems. For example, many organizations do not have the optimal staff and/or equipment to effectively and efficiently create, deliver, track and report the results of automated or semi-automated messaging campaigns. This may lead to inaccuracies or gaps in the delivery of the message to the intended recipients. Additionally, given the potentially wide variety of messages' number and frequency, targeted recipients, and message content, when disparate organizations are considered, it is often difficult to find a messaging solution that meets specific needs, leading to reluctant acceptance of solutions that are less than satisfactory. The costs of messaging system implementation can be daunting for many organizations, particularly schools and non-profit organizations. However, since creating and monitoring the delivery of messages to the relevant constituency is vital to many operations, it is rarely an optional activity. Accordingly, without improvements in the current systems, procedures, and methods for messaging, the overall process and user experience will continue to be sub-optimal.

SUMMARY

Some embodiments are directed to the technical problem of supporting a large volume of messages (whether for bulk messaging or other uses) without losing the ability to specify differences in message contents. Some embodiments provide message customization performed with a communications hub. The hub receives a messaging job creation request sent over a network connection. The messaging job creation request includes one of the following in digital form: (a) a destinations uniform resource locator ("URL") plus an inline contents list containing content specifiers, (b) a contents URL plus an inline destinations list containing recipient specifiers, or (c) a destinations URL plus a contents URL. When the job creation request includes a destinations URL, some embodiments automatically utilize the destinations URL to obtain via network communication a list of multiple recipient specifiers. Each recipient specifier specifies a recipient delivery address and a delivery mode. When the job creation request includes a contents URL, some embodiments automatically utilize the contents URL to obtain via network communication a list of multiple content specifiers. Each content specifier specifies at least a portion of message content to be delivered to at least one recipient.

In some circumstances, the messaging job creation request includes a destinations URL. In some of these, it also includes merge fields. For example, in some embodiments the recipient specifiers include at least one merge field and corresponding recipient merge value, the content specifiers include at least one merge field also present in the recipient specifiers, and the hub merges recipient merge values into respective message contents according to the at least one merge field.

In some circumstances, the messaging job creation request includes a contents URL. In some of these, the contents URL itself includes at least one merge field, and the hub proceeds by merging a content identification merge value into the contents URL to obtain a merged contents URL (the merged contents URL identifies a content specifier location). Then the hub retrieves at least one content specifier from the content specifier location. If the content specifier in turn includes at least one merge field, the hub also merges a recipient merge value into the content specifier merge field.

The URLs and the merge field locations can appear in various combinations, thereby supporting flexible message customization without hindering bulk messaging. For example, the messaging job creation request in some embodiments includes both a destinations URL and a contents URL, whereas in others it includes only one of the URLs and a list of specifiers appears in place of the other URL. Similarly, some embodiments include merging only down at the message level, some include merging only up at the contents URL level, and some include merge fields for both levels. That is, sometimes the hub merges a merge value into a contents URL to identify a content specifier location, sometimes the hub merges a (different) merge value into a message template to assemble a message, sometimes it does both, and sometimes it does neither.

Additional items may also be present in an embodiment. For example, in some embodiments the messaging job creation request also includes one or more of the following items: a callback URL for the communications hub to use when providing job status information, an explicit job start time, an explicit job start date, an explicit job expiration time, an explicit job expiration date, security measures such as passwords in headers or information transmitted using an HTTPS POST command, and/or other items described herein.

As further illustrations of flexible message customization, some embodiments assemble messages based on factors such as delivery mode, recipient set, and/or message content. Flexible message assembly may be part of a single messaging job which was created in response to the job creation request. For example, in some embodiments the hub assembles a first message based on a first message template for delivery according to a first delivery mode, and also assembles a second different message based on a second different message template for delivery according to a second different delivery mode. Some examples of delivery modes are email, synthesized and/or recorded voice (a.k.a. telephone call), fax, short message service ("SMS") texts, pushes to device applications, and postings on social media sites. In some embodiments, the hub assembles a first subset containing messages based on a first message template for delivery to a first set of recipients, and also assembles a second different subset containing messages based on a second different message template for delivery to a second different set of recipients. In some embodiments, the hub assembles a first set of messages for delivery to a first individual recipient, and also assembles a second different set of messages for delivery to a second different individual recipient.

To reduce recipient inconvenience and help lower delivery costs, some embodiments combine content of a first message having a first recipient delivery address with content of a second message which has the same recipient delivery address, and then submit the combined messages for delivery to the recipient delivery address as a single combined-content message. However, the hub may also avoid combining two messages to an individual recipient after determining that even though two messages have the same recipient they have different delivery modes. Some embodiments combine content of a first message having a recipient delivery address and a first recipient name with content of a second message which has the same recipient delivery address but a different recipient name, in the same job or a different job, and then submit the combined messages for delivery to the recipient delivery address. Combining messages may be done within a short time before submission for delivery, e.g., a second or a few seconds to a minute or a few minutes before delivery, or it may be done earlier than that.

In some embodiments, the messaging hub is part or all of a computer system, and it includes at least one processor, at least one memory in operable communication with the processor(s), and a messaging job creator residing in the memory. The messaging job creator includes code which upon execution with the processor(s) creates a messaging job after receiving a job creation request. The code determines whether a destinations URL is present in the job creation request, and determines whether a contents URL is present in the job creation request. When the job creation request includes a destinations URL the hub utilizes the destinations URL to obtain via network communication a list of multiple recipient specifiers, and when the job creation request includes a contents URL the hub utilizes the contents URL to obtain via network communication a list of multiple content specifiers. The hub code may merge a recipient merge value into message content according to a merge field, or merge a content identification merge value into a contents URL to obtain a content specifier location, or do both, one or more times for a given job in memory. The code may also determine whether to combine content of a first message with content of a second message based on at least recipient delivery address(es) and delivery mode(s).

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Some Acronyms

Figure 1:
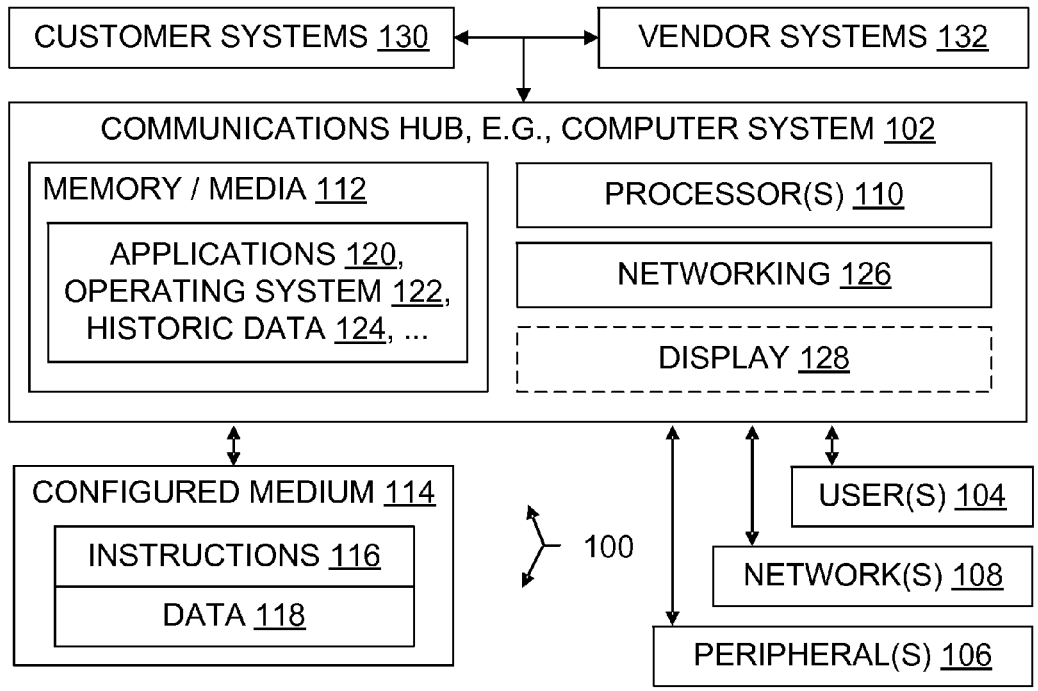
FIG. 1 is a block diagram illustrating a computer system having at least one processor and at least one memory which interact with one another under the control of software for messaging, and other items in an operating environment which may be present on multiple network nodes, and also illustrating configured storage medium (as opposed to a mere signal) embodiments.

Some acronyms are defined below, but others may be defined elsewhere herein or require no definition to be understood by one of skill.

API means application program interface.
ECH means enterprise communications hub
HTTP means hypertext transfer protocol.
HTTPS means hypertext transfer protocol secure.
ID means identity or identifier.
ISO means International Standards organization.
JSON means JavaScript® object notation; JavaScript is a mark of Oracle America, Inc.
POST is customarily written in all caps but it is not an acronym; it refers to an HTTP or HTTPS method for data transmission.
RAM means random access memory.
REST means representational state transfer.
ROM means read-only memory.
SMS means short message service.
SMTP means simple mail transfer protocol.
TCP/IP means transport control protocol/internet protocol.
URI means uniform resource identifier (sometimes also called a universal resource identifier).

URL means uniform resource locator (sometimes also called a universal resource locator). URIs and URLs are used interchangeably herein, unless an embodiment description expressly states otherwise or a result would be inoperable.

VXML means voice extensible markup language.

Note Regarding Hyperlinks

Portions of this disclosure contain URLs, hyperlinks, and/or other items which might be considered browser-executable codes. These items are included in the disclosure for their own sake to help describe some embodiments, rather than being included to reference the contents of the web sites that they identify. Applicants do not intend to have these URLs, hyperlinks, or other such codes be active links. None of these items are intended to serve as an incorporation by reference of material that is located outside this disclosure document. Thus, there should be no objection to the inclusion of these items herein. The Patent Office will disable these items when preparing this document's text to be loaded onto its official web database. MPEP §608.01(VII).

An Overview

High volumes and flexible contents are at odds with each other in many messaging systems. Some systems excel at rapidly pumping out tens of thousands of message very quickly, for example, but only if the content of every message is the same, or very nearly the same. At the other extreme, some messaging systems such as consumer email programs allow enormous variation in content between different messages, but the preparation of each message requires minutes (at least) of personal attention by the sender. By contrast, some embodiments described herein provide a balance between supporting a large volume of messages to be delivered rapidly (hundred per second) and permitting a user to specify differences in message contents.

Some embodiments described herein may be viewed in a broader context. For instance, concepts such as contents, destinations, listing, merging, and retrieving may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving contents, destinations, listing, merging, and/or retrieving are outside the present scope. Accordingly, vagueness, mere abstractness, lack of technical character, and accompanying proof problems are also avoided under a proper understanding of the present disclosure.

Some Observations About Terminology

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" or "programmatically" means by use of automation (e.g., general purpose computing hardware configured by software for specific operations and technical effects discussed herein), as opposed to without automation. In particular, steps performed "automatically" or "programmatically" are not performed by hand on paper or in a person's mind, although they may be initiated by a human person or guided interactively by a human person. Automatic or programmatic steps are performed with a machine in order to obtain one or more technical effects that would not be realized without the technical interactions thus provided. The terms "automatically" and "programmatically" are used interchangeably herein.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Some similar considerations of speed and accuracy apply to embodiments described herein, in addition to considerations such as coordination with digital memories and packet-switched networks (neither of which can be performed by mental steps or paper alone).

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as assembling, combining, creating, delivering, determining, expiring, getting, identifying, including, merging, messaging, obtaining, parsing, receiving, specifying, starting, submitting, transmitting, using, utilizing (and assembles, assembled, combines, combined, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. No claim covers a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Thus, "computer readable medium" means a computer readable storage medium, not a propagating signal per se.

An "embodiment" herein is an example. Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise.

Aspects of Some Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

System administrators, developers, engineers, customers, content providers, delivery vendors, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

Figure 3:
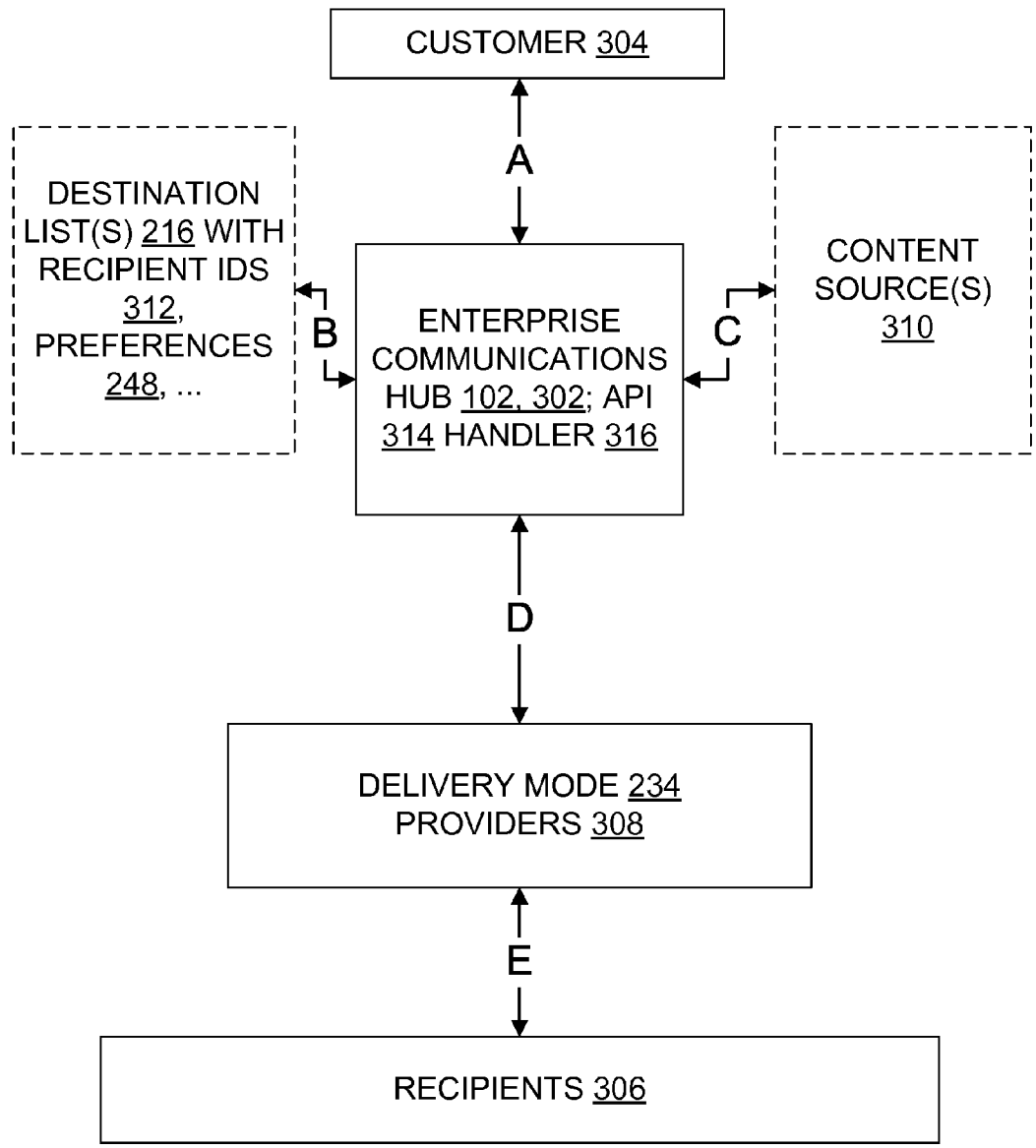
FIG. 3 is a data flow diagram illustrating aspects of flexible bulk message customization in an example architecture.

In the illustrated environments 100, one or more applications 120 and one or more operating systems 122 have associated historic data 124 which they generate, modify, and/or otherwise access. The applications 120 may include messaging software, utility software, software development tools, diagnostic software, business software, and other software applications or tools which have a human-operable user interface. Networking cards, network stacks, and other items in a networking module 126 may reside partially or entirely within an operating system 122 or be separate therefrom. Communications may travel over one or more networks 108 between the system 102 and other systems such as customer systems 130 and vendor systems 132. FIG. 3 discussed below shows an example architecture supporting such network communications between a hub 102, customers, and vendors (delivery mode providers).

The applications 120, operating system 122, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s) 128, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Aspects of Some Systems

Figure 2:
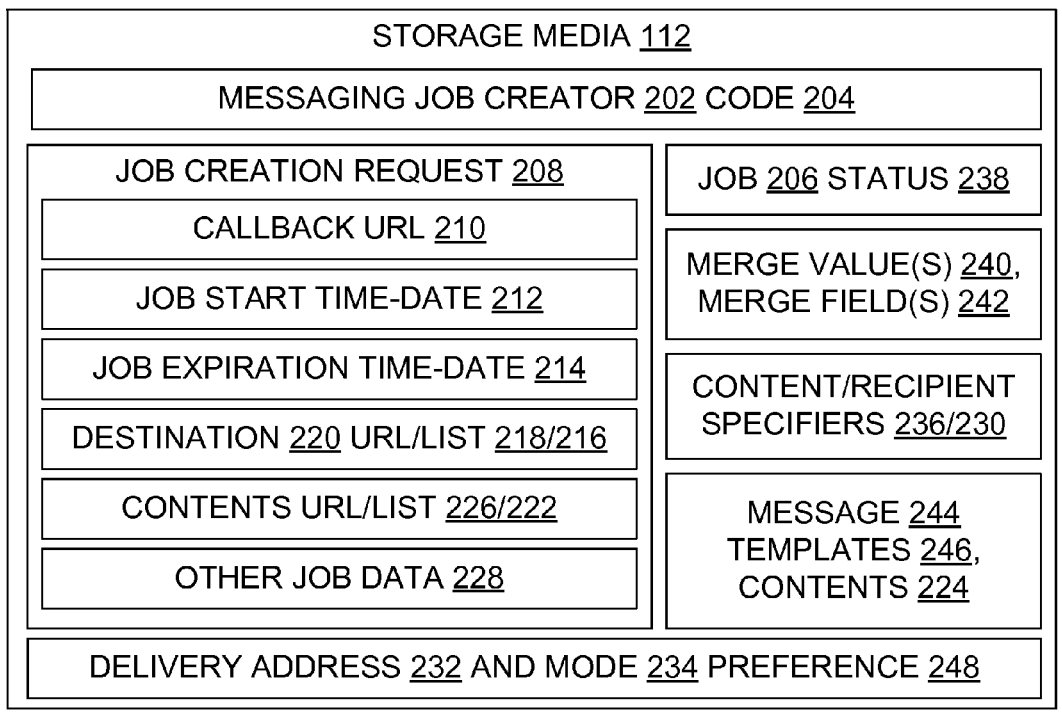
FIG. 2 is a block diagram further illustrating aspects of a communications hub in an example architecture.

FIG. 2 illustrates aspects of an architecture which is suitable for use with some embodiments. A computer system includes a messaging job creator 202 residing in memory 112 (RAM, hard disk, and/or other memory 112). The messaging job creator 202 includes code 204 for message 244 creation which upon execution with at least one processor 110 creates a messaging job 206 after receiving a job creation request 208. The job creation request 208 includes one or more of the following, in varied combinations and with one or more instances, depending on the circumstances: a callback URL 210, a job start time and/or date 212, a job expiration time and/or date 214, a list 216 of message destinations 220, a destination URL 218, a list 222 of contents 224, a content URL 226, other job data 228 such as job ID, customer ID, password, authentication certificate, billing information, logging level indicator, and/or other administrative information.

In some embodiments, the code 204 operates at least in part by determining whether a destinations URL 218 is present in the job creation request 208, and determining whether a contents URL 226 is present in the job creation request 208. When the job creation request includes a destinations URL, the system 102 automatically utilizes the destinations URL to obtain via network 108 communication a list of multiple recipient specifiers 230. Each recipient specifier 230 specifies a recipient delivery address 232 and a delivery mode 234. When the job creation request 208 includes a contents URL 226, the system 102 automatically utilizes the contents URL 226 to obtain via network 108 communication a list of multiple content specifiers 236. Each content specifier 236 specifies at least a portion of message content 224 to be delivered to at least one recipient. In some embodiments, the job creation request includes both a destinations URL 218 and a contents URL 226.

In some embodiments, the system with the job creation request 208 in the memory includes a number (one, two, three, up to all) of the following items: a callback URL 210 to use when providing job status 238 information; an explicit job start time in item 212; an explicit job start date in item 212; an explicit job expiration time in item 214; an explicit job expiration date in item 214; information for one or more items 210-226 transmitted using an HTTPS POST command; an inline contents list 222 containing content specifiers 236; an inline destinations list 216 containing recipient specifiers 230; and/or an inline list containing zero or more merge values 240 and/or zero or more merge fields 242. Merge fields 242 may occur in a contents URL 226 and/or in message templates 246.

In some embodiments, the messaging job creator code 204 upon execution merges a recipient merge value 240 into message content 224 according to a merge field 242. In some, messaging job creator code 204 upon execution merges a content identification merge value 240 into a contents URL 226 to obtain a content specifier 236 location.

In some embodiments, the message combining code 204 upon execution determines whether to combine content 224 of a first message 244 with content 224 of a second message 244. The determination is based on at least recipient delivery address(es) 232 in some cases, and on at least recipient delivery address(es) 232 and also delivery mode 234 preference(s) 248 in some cases.

With reference to FIGS. 1 and 2, some embodiments provide a computer system 102 with a logical processor 110 and a memory medium 112 configured by circuitry, firmware, and/or software to provide job creating and/or messaging functionality as described herein. In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, content specifiers 236, recipient specifiers 230, message templates 246, message contents 224, and job requests 208 may each be on one or more devices/systems 102 in a networked cloud, and the messages 244 may be sent to yet other cloud device(s)/system(s) 102 for delivery.

Aspects of Some Processes

Figure 4:
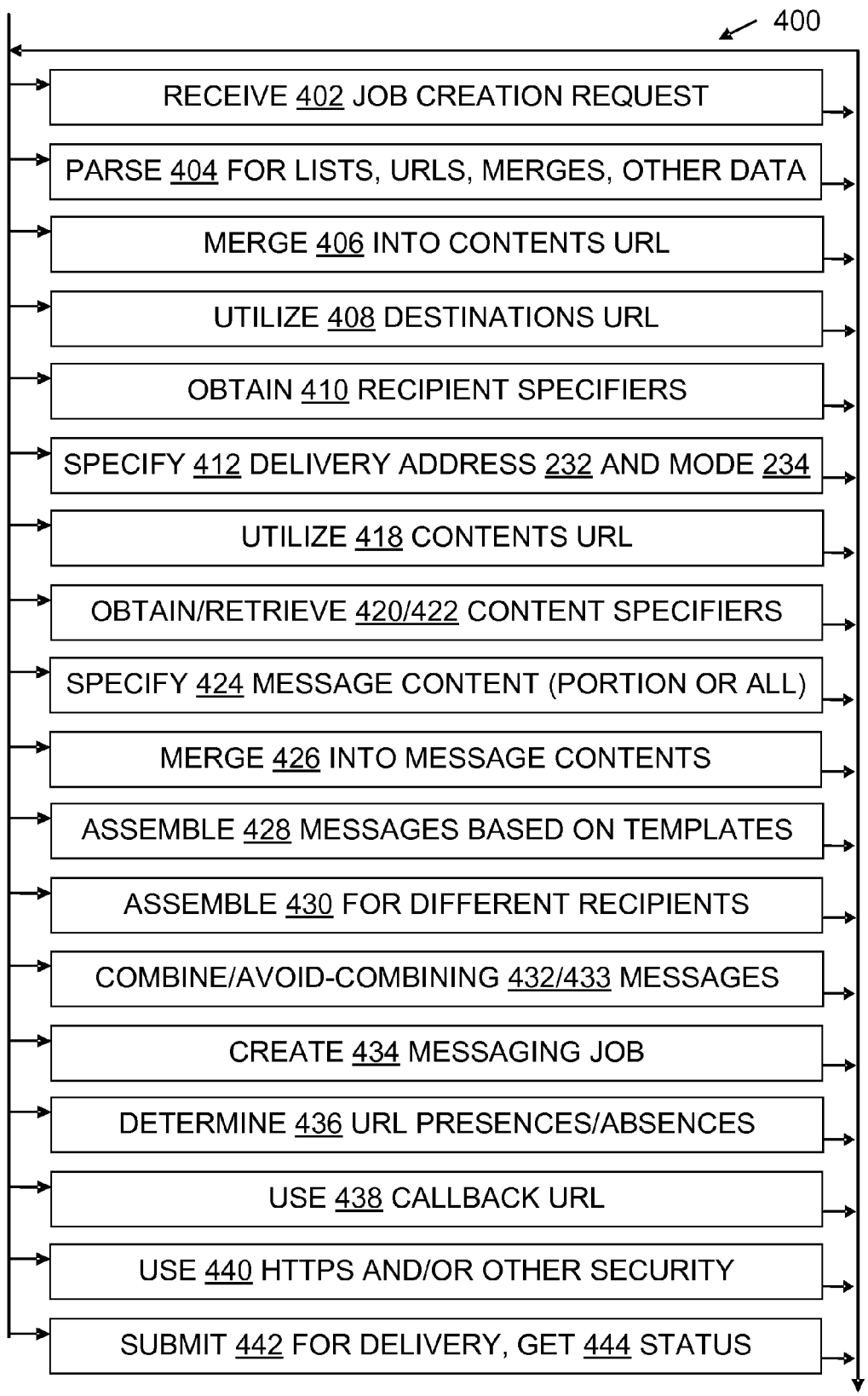
FIG. 4 is a flow chart illustrating steps of some process and configured storage medium embodiments.

FIG. 3 is a data flow diagram illustrating aspects of flexible bulk message customization in an example architecture. Thus, FIG. 3 illustrates aspects both of system embodiments and of process embodiments. FIG. 4 also illustrates aspects of some process embodiments, in a flowchart 400. Technical processes shown in the Figures or otherwise disclosed may be performed in some embodiments automatically, e.g., by messaging code under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 4. Steps may be performed serially, in a partially overlapping manner, or fully in parallel. The order in which flowchart 400 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

In some embodiments, a message customization process is performed with a communications hub 302. Code at the hub receives 402 a messaging job creation request 208 sent over a network connection by a customer 304. The messaging job creation request includes one of the following in digital form: (a) a destinations uniform resource locator (URL) 218 plus an inline contents list 222 containing content specifiers, (b) a contents URL 226 plus an inline destinations list 216 containing recipient specifiers, or (c) a destinations URL 218 plus a contents URL 226. The hub 302 parses 404 the received data to ascertain the lists, determine 436 which URLs are present or absent, and ascertain other job data 228. Parsing 404 may be accomplished using lexical analysis, syntactic analysis, tokenization, and/or other parsing mechanisms adapted for the particular data content and format employed in job creation requests 208 in the embodiment in question.

When the job creation request includes a destinations URL, this process creates 434 a job 206 in part by utilizing 408 the destinations URL to obtain 410 via network communication a list of multiple recipient specifiers 230. In these communications and other network 108 communications noted herein, network protocols and formats for HTTP, HTTPS, JSON, REST, TCP/IP, and/or others may be used to utilize an URL and/or obtain or send data via one or more networks 108. Each pertinent recipient specifier specifies 412 a recipient delivery address 232 and/or other recipient ID 312, and a delivery mode 234, using data fields, data values, objects, data structures, data types, and/or other data specification mechanisms adapted for the particular data content and format employed in job recipient specifiers 230 in the embodiment in question.

When the job creation request includes a contents URL, this process creates 434 a job 206 in part by utilizing 418 the contents URL to obtain 420 via network communication a list of multiple content specifiers 236. Each pertinent content specifier specifies 424 at least a portion of message content to be delivered to at least one recipient 306. Messages 244 are not necessarily delivered directly to recipients by the hub 302; some or all messages may instead be submitted 442 by the hub 302 to one or more delivery mode providers 308 such as bulk messaging providers who specialize in delivery of email, telephone messages, fax messages, and/or other message delivery modes 234.

In some embodiments, the messaging job creation request includes a destinations URL, and in addition the recipient specifiers include at least one merge field and corresponding recipient merge value, and the content specifiers include at least one merge field also present in the recipient specifiers. Under these circumstances, a process may merge 426 recipient merge values into respective message contents according to the at least one merge field.

In some embodiments, the messaging job creation request includes a contents URL, and the contents URL includes at least one merge field. Under these circumstances, a process may merge 406 a content identification merge value into the contents URL to obtain a merged contents URL. The merged contents URL then identifies a content specifier location, e.g., a content source 310 location. The process may then retrieve 422 at least one content specifier from the content specifier location. If the content specifier includes at least one merge field, the process may merge 406 a recipient merge value into the content specifier merge field. If the recipient specifiers include at least one merge field and corresponding recipient merge value, and the content specifiers include at least one merge field also present in the recipient specifiers, the process may also merge 426 recipient merge values into respective message contents according to the at least one merge field. Merging 406 and/or merging 426 are part of job creation 434 in some embodiments.

In some embodiments, a process performs the following sequence as part of a single messaging job which was created 434 in response to the job creation request: combine 432 content of a first message having a recipient delivery address with content of a second message which has the same recipient delivery address, and then submit 442 the combined messages for delivery to the recipient delivery address. In some embodiments, the process avoids 433 combining two messages to an individual recipient after determining that even though the messages have the same recipient they also have different delivery modes.

In some embodiments, a process combines 432 content of a first message having a recipient delivery address and a first recipient name with content of a second message which has the same recipient delivery address but a different recipient name, and then submits 442 the combined messages a vendor 308 for delivery to the recipient delivery address. For example, the recipient delivery address may be or include a telephone number or email address. In some embodiments, the process combines 432 content of a first message having a recipient delivery address provided in a first job 206 with content of a second message for which the same recipient delivery address was provided in a different job 206', and then submits 442 the combined messages for delivery to the recipient delivery address in one of the jobs.

In some embodiments, a process assembles 428 a first message based on a first message template 246 for delivery according to a first delivery mode, and also assembles 428 a second different message based on a second different message template 246' for delivery according to a second different delivery mode. In some embodiments, a process assembles 430 a first subset containing messages based on a first message template 246 for delivery to a first set of recipients 306, and also assembles 430 a second different subset containing messages based on a second different message template 246' for delivery to a second different set of recipients 306'. In some embodiments, a process assembles 430 a first set of messages for delivery to a first individual recipient, and also assembles 430 a second different set of messages for delivery to a second different individual recipient.

In some embodiments, a process avoids 433 combining two messages to an individual recipient after determining that even though the messages have the same recipient 306 they also have different delivery modes 234. For example, in some cases the different delivery modes 234 include a telephone call delivery mode and an SMS delivery mode.

In some embodiments, a process combines 432 content of at least two messages for delivery to a single recipient delivery address. This combination may be made shortly before delivery, or at least shortly before submission 442 for delivery. For example, in some cases the combining occurs no more than five minutes prior to submitting the combined messages to a delivery mode provider for delivery to the recipient delivery address. In some, the combining occurs no more than one minute prior to submitting the combined messages to a delivery mode provider for delivery to the recipient delivery address.

Some embodiments use 438 a callback URL 210 to send job status 238 to a location specified by a customer 304, after getting 444 a status indication from the delivery mode provider(s) 308.

Some embodiments use 440 HTTPS instead of HTTP and/or use other security measures, such as passwords, encryption, or authentication certificates.

Aspects of Some Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as job creation requests 208, content specifiers 236, recipient specifiers 230, and/or code 204, in the form of data 118 and instructions 116, read from a removable medium 114 and/or another source such as a network connection, to form a configured medium. The configured medium 112 is capable of causing a computer system to perform technical process steps for messaging job creation and/or messaging customization as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Some Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from ParentLink® software documentation; ParentLink® software is implemented by Parlant Technology, Inc., owner of the ParentLink® mark. Aspects of the ParentLink® software and/or documentation are consistent with or otherwise illustrate aspects of the embodiments described herein. However, it will be understood that ParentLink® software documentation and/or implementation choices do not necessarily constrain the scope of such embodiments, and likewise that ParentLink® software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

In some embodiments consistent with FIG. 3, each job request 208, no matter the delivery method, provides some basic information to ECH 302 about the requested job. For all jobs the total number of destinations will be provided, along with the local timezone string, and start time, in standard ISO 8601 format. If a timezone specifier is not provided in the start time string the local timezone of the job is presumed. Additionally, a job request 208 may provide an expire time, in standard ISO 8601 format, a name 228, and a local ID 228 for the job. Job requests can be sent to ECH 302 before the start time, but there can be a threshold limiting how early they are allowed. ECH will not start delivering the job until the start time has arrived. The local timezone is used to prevent phone and SMS jobs from delivering in the middle of the night. There is a standard blackout time from 9:30 pm to 8:00 am each night that may over-ridden by users with permission to do so. In some embodiments, customers specify a blackout time in the job request. In some embodiments, there is no blackout time, e.g., when delivering content is particularly urgent.

An ECH Job Basic Example

A user 104 such as a customer 304 creates a job through the Enterprise Communications Hub (ECH) by sending the following JSON data through an HTTPS POST request, along pathway A of FIG. 3, to a specified URI handled by the ECH system: https://api.parlant.com/ech/v1/email. Note the remarks above regarding hyperlinks; like the other URI's herein, this link is not intended to be active and not intended to incorporate any material into this disclosure by reference.

{
"startDateTime": "2014-04-22T18:00:13-06:00",

"expireDateTime": "2014-04-22T21:30:24-06:00",
"total": 1,
"destinations": [{"destination": "test.user@parentlink.net"}],
"timezone": "US/Mountain",
"name": "Reminder Email Message",
"localID": "202105"
"subject": "Parent Teacher Conferences",
"content": "Dear Parents,\nWe wanted to remind you about parent teacher
conferences this week.\nSincerely,\nWestdale City School District",
"reply": "noreply@parentlink.net",
"callbackURL":
"https://parlant_api_userparlant_api_password@api.parlant.com/status/"
}

In this job creation POST "total" is the total number of destinations the job has. If there are more destinations than can be processed in a single job creation request POST, the total lets ECH 302 know when all of the destinations have been received from the customer.

In this job creation POST the "localID" is an ECH customer-supplied ID for an ECH job. There is no guarantee that it will be unique, so it is only used for reporting purposes as an ECH assigned ID for a job would have little meaning to a customer. However, when the initial job creation request is sent, ECH responds with the ECH assigned ID for the job. This will allow the customer to map their localID to the ECH id.

An ECH API 314 handler 316 will receive this POST data. The POST provides the start and expire time for a job and other pertinent information to deliver the job content to each destination. ECH 302 will analyze the destinations to determine 436 it is a list, not a URI string. ECH will analyze the content to determine 436 it is not a URI string, and contains no merge codes. Because the destination list and the content are not URIs, ECH will not make any requests for additional information along FIG. 3 pathways B or C. Instead, taking the provided subject line, reply email address, content, and destinations, ECH will send the message using SMTP to each destination in the provided list of destinations along pathway D. For each destination, ECH will return the status 238 provided by the SMTP server by sending an HTTPS POST to the callback URL 210 that contains the status of the delivery attempt, the date and time of the delivery attempt, a description, and all of the information provided to ECH about the destination.

An ECH Content Merge Fields Example

A user 104 creates a job through ECH sending the following JSON data through an HTTPS POST request, along FIG. 3 pathway A, to a specified URI handled by the ECH system: https://api.parlant.com/ech/v1/sms (see note above regarding hyperlink inactivity).
{
"startDateTime": "2014-04-22T18:00:13-06:00",
"expireDateTime": "2014-04-22T21:30:24-06:00",
"total": 1,
"destinations": [{"destination": "+8015551234", "firstName":"Martha", "student":
"Paul Jones", "teacher": "Mrs. Peterson"}, {"destination": "+18015551234",
"firstName":"James", "student": "Damon Stevens", "teacher": "Mr. Franklin"}],
"timezone": "US/Mountain",
"name": "Reminder Email Message",
"localID": "202105"
"content": "{firstName}, you have a parent teacher conferences this week
regarding {student} with {teacher}",
}

The ECH API handler 316 will receive this POST data. The POST provides the start and expire time for a job 206 and other pertinent information to deliver the job content to each destination. ECH will analyze the destinations to determine 436 it is a list, not a URI string. ECH will analyze the content to determine 436 it is not a URI string, but does contain merge codes 240 matching the keys 242 provided with the destinations (firstName, student, teacher). Because the destination list and the content are not URIs, ECH 302 will not make any requests for additional information along FIG. 3 pathways B or C. Instead, taking the provided content, ECH will send the message merge (message content created by merging) in the data from each destination in the destinations list. ECH will deliver the generated content to each destination along pathway D to an SMS provider 308.

For each destination, ECH will return the status provided by the provider by sending an HTTP POST to the callback-URL that contains the status of the delivery attempt, the date and time of the delivery attempt, a description, and all of the information provided to ECH about the destination. The status code from the provider is converted to a status code that has meaning to the customer. Each numeric code corresponds to a default text description which can be over-written by ECH or one of the providers 308 to give a more descriptive status. The status code from the provider is included as part of the text description. For instance, a status of 200 may correspond to a default text description of "Email delivered" and would likely not be over-written. A status of 403 may correspond to a default text description of "Mail server rejected delivery". But the mail server may return a more descriptive explanation for why the delivery attempt failed, e.g., "fake@email.com is not a valid email address". This description would often be more valuable to the ECH customer. So the status code is returned as a general status, and the description will likely have more pertinent information for the user.

An ECH Destination and Content URI Example

A user 104 creates a job through ECH sending the following JSON data through an HTTP POST request, along FIG. 3 pathway A, to a specified URI handled by the ECH system: https://api.parlant.com/ech/v1/phone (see note above regarding hyperlink inactivity).
{
"startDateTime": "2014-04-22T18:00:13-06:00",
"expireDateTime": "2014-04-22T21:30:24-06:00",
"total": 1,
"destinations":
"https://parlant_api_userparlant_api_password@api.parlant.com/destinations/8a 44743dbe404a2f84ede992c265a3c6",
"timezone": "US/Mountain",
"name": "Reminder Phone Message",
"localID": "202105"
"subject": "Parent Teacher Conferences",
"content":
"https://parlant_api_user:parlant_api_password@api.parlant.com/messages/88d5 5fb015f541f8b7ce4a4e1d4e4352",
"callerID": "801-555-9876",
}

The ECH API handler 316 will receive this POST data. The POST provides the start and expire time for a job and other pertinent information to deliver the job content to each destination. ECH 302 will analyze the destinations to determine 436 it is a URI string, not a list. ECH will request the destination list at the destinations URI, along FIG. 3 pathway B, verifying that the response contains a Content-Type header of application/json. It will analyze the data returned in the body of the HTTP response to determine that it is a valid list with the correct destinations. For example, ECH may perform a syntax check to make sure each destination is syntactically valid as a phone number, as an email address, etc. ECH receives the following data from the destinations URI:
[{"destination": "+8015551234"}, {"destination": "+18015551234"}]

ECH will analyze the content to determine 436 it is a URI string. ECH will then request the content of the message at the content URI, along pathway C. It will verify that the response contains a Content-Type header of application/vxml since this has been specified as a phone message. ECH will then read the response data and verify that it is a valid VXML string. ECH receives the following VXML string:
<vxml><prompt><audio src="https://api.parentlink.net/audio/1234"></audio></prompt></vxml>

ECH 302 now analyzes the VXML string to determine if there are any merge fields that match the keys provided with each destination. Since there are none, ECH calls each phone number in the destinations provided and plays the VXML along FIG. 3 pathway D. ECH monitors the status of each call and returns the status by sending an HTTP POST to the callback URL 210 that contains the status of the delivery attempt, the date and time of the delivery attempt, a description, and all of the information provided to ECH about the destination.

An ECH Destination and Content URI with Merge Fields Example

A user 104 creates a job through the Enterprise Communications Hub (ECH) sending the following JSON data 208 through an HTTP POST request, along FIG. 3 pathway A, to a specified URI handled by the ECH system: https://api.parlant.com/ech/v1/job (see note above regarding hyperlink inactivity).
{
"startDateTime": "2014-04-22T18:00:13-06:00",
"expireDateTime": "2014-04-22T21:30:24-06:00",
"total": 1,
"destinations":
"https://parlant_api_userparlant_api_password@api.parlant.com/destinations/8a 44743dbe404a2f84ede992c265a3c6",
"timezone": "US/Mountain",
"name": "Reminder Email Message",
"localID": "202105"
"subject": "Parent Teacher Conferences",
"content":
"https://parlant_api_userparlant_api_password@api.parlant.com/messages/{recipientID}",
"attachments":
["https://parlant_api_userparlant_api_password@api.parlant.com/attachments/bb 32760e303c4e7486e9881059a044ed"]
"reply": "noreply@parentlink.net",
"callbackURL":
"https://parlant_api_userparlant_api_password@api.parlant.com/status/"
}

The ECH API handler 316 will receive this POST data. The POST provides the start and expire time for a job and other pertinent information to deliver the job content to each destination. ECH will analyze the destinations to determine 436 it is a URI string, not a list. ECH will request the destination list at the destinations URI, along pathway B, verifying that the response contains a Content-Type header of application son. It will analyze the data returned in the body of the HTTP response to determine 436 that it is a valid list with the correct destinations. ECH receives the following data from the destinations URI:
[{"destination": "test.user@parentlink.net", "recipientID": "123456", "firstName":"Marttext/htmlha", "student": "Paul Jones", "teacher": "Mrs. Peterson"}, {"destination": "+18015551234", "recipientID": "987654", "firstName": "James", "student": "Damon Stevens", "teacher": "Mr. Franklin"}]

ECH will analyze the content to determine 436 it is a URI string that contains a merge field that matches the keys provided with the destinations. ECH will then request the content of the message, along pathway C, for each destination merging the recipientID value in the recipientID field in the content URI before making the request.

For the first destination ECH 302 will verify that the response contains a Content-Type header of text/html or text/plain since the destination is an email address. ECH will then read the response data and verify that it is a valid text or HTML string. ECH receives the following HTML string for the first recipient:
<html><body>Dear {firstName},<br>We wanted to remind you about parent teacher conferences this week regarding<b>{student}</b>.<br>Sincerely, <br>{teacher}<br>Westdale City School District</body></html>

ECH now analyzes 404 the HTML to determine that there are merge fields matching the keys provided with the destination. ECH merges in the values for each field from the destination to generate the specific content for this destination. Taking the provided subject line, reply email address, and generated content ECH will send the message using SMTP to the destination along FIG. 3 pathway D. ECH will return the status provided by the SMTP server by sending an HTTP POST to the callback URL 210 that contains the status of the delivery attempt, the date and time of the delivery attempt, a description, and all of the information provided to ECH about the destination.

For the second destination, ECH 302 will verify that the response contains a Content-Type header of text/html or application/vxml since the destination is a phone number. ECH will then read the response data and verify that it is a valid text or VXML string. ECH receives the following VXML string for the first recipient:
<vxml><prompt><audio>{firstName}</audio><audio src="https://api.parentlink.net/audio/1234"></audio><audio>{student}</audio><audio src="https://api.parentlink.net/audio/9876"></audio><audio>{student}</audio><au dio src="https://api.parentlink.net/audio/2746"></audio></prompt></vxml>

ECH now analyzes 404 the VXML string to determine that there are merge fields that match the keys provided with the destination. ECH merges in the values for each field from the destination to generate the specific content for this destination. ECH then calls the phone number along FIG. 3 pathway D and plays the VXML. The plain text data merged into the VXML is played as Text To Speech. ECH monitors the status of the call and returns the status by sending an HTTP POST to the callback URL that contains the status of the delivery attempt, the date and time of the delivery attempt, a description, and all of the information provided to ECH about the destination.

Additional Observations on Combining Messages

Some embodiments perform just-in-time call combining and/or other message combining steps on a message before the message is sent out for delivery. In some embodiments, the system checks whether a phone number is queued. If yes, it adds content 224. If no, it queues the job for that phone number and adds message content if needed. Adding content may include call combining. For example, suppose Joe has a son and a daughter. A snow storm alert is to be sent to both of the children. If a first message about Joe's son was queued to go to his home phone then during staging of the second message about his daughter, the content for the message would be combined. If the message is the same for two kids such as "no school tomorrow", the system may change a message introduction to say "Regarding Mary and Sam, no school tomorrow." If the messages are personalized such as "Mary got an A on her test" and "Sam missed first period" then combining content may involve the addition of content to the first message.

Some embodiments have a system structure that generally adheres to a FIFO data flow, that is, the first thing in is the first thing out. The system has a queue with records in a data store. An example of a record is 801-444-1234>[JOB ID1, JOB ID2, JOB ID3]. JOB3 could be added before the message has been sent out; this an example of call combining where job3 is added to job1 and job2. Some systems also take into account a level of importance for a message and a time component (e.g., a phone number may not be in-schedule until 5 PM). Some systems store the messages that were sent; for example, Job 1 was sent to dad and job 2 was sent to mom. Some embodiments pull from different data stores, first pulling info about the destination and second pulling the content. The jobs in a queue are ordered by delivery priority, which is determined by the level of importance for a job and whether the destinations of that job are available, based on delivery schedules.

Further Observations

Some embodiments combine aspects such as batch API processing, multimodal delivery, customizable content, least cost delivery, and message combining. Some support making a single API call with a list of student IDs, and then on the backend servers return individualized messages for the students and then another system (or the same system) delivers the messages. This contrasts with approaches which make separate API calls for each student or other recipient 306. Some embodiments will recognize that multiple schools (for example) are involved when a call should be made, then identify all of the recipients across all of the schools and go to a URL to request the student ID for each person in turn. Two students may be located at different schools but share the same phone number, for example.

Some embodiments support mass messaging and customization by using a URL with merge codes, and sometimes templates 246 with merge fields that are passed through the URL. Some embodiments include a distributed mass messaging system that allows customers to send customized messages to any number of destinations over many methods of communication including: phone (landline or mobile), SMS, email, mobile app push notifications, and various social network messaging systems. Some systems perform auto-redelivery.

Some systems include a job server as a hub 302 which communicates with a data store, such as a key-value store. The job server stages all jobs of all modes (phone, SMS, social media, etc.) for content which has been stored in a data store 310. The data store has a networkable interface for communicating with other servers as delivery providers 308, such as an SMS server, an e-mail server, a social media server, and a phone server, connected to phone lines and/or networks.

Some embodiments can be instructed to call X number of people. They will look at destinations and combine duplicate numbers so they only call once if the same number was scheduled to receive the same message.

With regard to defining a message and recipients, in some embodiments a job 208 is defined as message content and a list of destinations and a callback URL. Jobs are often limited by bandwidth; if there was unlimited bandwidth then there would be no limit on the size of the job. But since a giant job usually takes a long time, it may be helpful or even necessary to break up the messages into different jobs. The content of a message could be HTML or VXML or just a URL which returns that information to the system hub. Before the hub delivers a message, it can fetch message content from a URL, or more precisely, from the location specified by a URL.

Some embodiments allow a customer using the system to define a customized message that can be sent to as many recipients as desired over different methods of communication. In order to overcome the different message formats that different communication methods require, some embodiments use merge fields to receive recipient data from customers. The data that is received from customers is then applied to the customers' recipients using the predefined merge fields in the various messaging formats suited to different communication methods. For example, suppose a customer wants to send a message over SMS to recipient group 1 and send the same message over email to recipient group 2. The customer would use a single format, using merge fields as defined in the system API 314, to send their message to the hub. The hub would then analyze the message to see who the recipient is and how it should be delivered. This can be done for any combination of recipients groups or communication methods, even for single recipients.

One implementation of the merge fields is to use URLs to send and receive message data between the hub and customers. A customer will send an HTTP request to a specific URL that has been setup by the system to receive message data, along with merge fields, in order to setup a message. An example of the URL would be http://myparlantmessage.com/{recipientID} which could return "Hello {firstname} {lastname}." This allows customers 304 to develop their own interfaces and software around the API 314 and allows an embodiment to be extremely flexible in meeting customers' needs. Whoever managed the preceding URL would be responsible for the content.

Here is another example of how to use the URL:
The following 2 records belong to a job:
801-555-1234, {PID:1579; fname:Jan}
801-444-2567, {PID:1382, fname:Peter}

The system makes a callback to the URL and the PID: 1579 is passed through the URL. Whoever is hosting the URL has stored in its data store whether any messages should be sent to the student (or the parents of the student) having the ID of 1579. If a message sender has requested that a message be sent to PID 1579, then the corresponding message will be passed back to the system. In some embodiments, the corresponding message will have merge fields, such as a merge field for [fname] (first name). If the record contains two merge fields, such as {fname:Jan}, then the system may insert the defined value for the merge field into the corresponding message. For example, a URL contains merge fields, such as {fname:Jan}, and the corresponding message template which has been passed back has a merge field for "fname" then the system will replace the merge field "fname" with the string "Jan". If the system has determined that the mode of delivery for the message is "a phone", then the message may be returned in the appropriate format, such as VXML. Ins some embodiments, the API call determines the type of message; different URLs are set up depending on the job, e.g., as endpoints on the API or as handlers, such as http:/123/email for email, http:/123/sms for SMS, and so on.

Some embodiments operate as follows. A customer 304 states an URL, which may in some cases be an authenticated URL such as https://username:password@parentlink.net. When the system sends a request to the URL, the system will first strip out username:password from the URL and place it in a header for each request. This makes it more difficult for snoopers to hack user names and passwords.

When the system delivers the message it will look at the content of the message; if the content is static with no merge fields then the system will simply deliver it to the destination. However, some embodiments can work with different scenarios. One scenario uses a different URL for each destination. Another uses a template with merge codes for each destination. Another does both. If a customer wants to track how often the system makes requests, a log may be kept. By using merge codes, customers can decrease stress on their servers for a large batch. Given static content with a merge field, some embodiments will validate, merge, and then deliver. Validation verifies that if a merge field, such as FNAME, is listed, then the destination list defines destinations for the merge field FNAME. Given a URL without a merge code embedded in the URL, some systems send a content request to the URL, fetch the content and process the content as described elsewhere herein, depending on the format of the content.

Given merge codes embedded in an URL, an embodiment will also validate, fetch content, and process the content as described elsewhere herein, depending on the format of the content. A customer may create the URL with merge fields so that the URL can be different for each person, because the hub 302 can perform a merge using the merge fields. A URL with merge fields allows for sending the information in small packets each time a request is made to the URL versus having to create a job for each destination, assuming that unique message content is sent to each message recipient. The merge fields could include the person ID, and the hub could then merge the content with the destination list. When a hub fetches content, a server may create a single job with a single list of destinations. The URL with merge codes allows message senders to send dynamic content which differs for each person. That is, substantive differences in the content versus merely changing the name in each message.

As to message combining, in some embodiments when a job comes in it is staged as quickly as possible; staging means jobs are in a queue ordered by the time when they can be delivered. At or very near the time of delivery jobs are transferred to ready queue which means deliver now and which has destinations such as phone numbers. Some embodiments include different ready queues for different modes 234 (phone ready queue, etc.). At the time to be delivered, a software agent pulls phone numbers from the ready queue and dials. Up until the time when the phone number is moved from the ready queue, a job can be added to the phone number. If a phone number is in a ready queue for two jobs and a third job from staging queue is added to that ready queue, rather than inserting a new record some embodiments add the third job to the first two jobs. The staging queue is a place holder for jobs not ready to be sent just yet. The ready queues contain jobs that are ready to be sent immediately. This architecture allows for just in time combining of calls and/or other messages 244.

A destination-centric view differs from a person-centric view. A person-centric view would look at all of the possible numbers which can be combined for a person (it knew about the person). By contrast, a destination-centric view deals in destinations, so call combining is faster and can be done just in time. Combining multiple messages to the same recipient together into a single message may save delivery costs.

However, some embodiments combine messages only when the communication method 234 of the two messages is the same. If message A is defined as an SMS message, and message B is defined as a phone call, then message A will not be combined with message B, because customer delivery preferences 248 take priority over message combining optimizations.

As to automatic message delivery retry, in some instances, a message 244 will fail to be delivered to the intended recipient 306. For instance, when a phone call is placed all the circuits in the recipient's area could be in use, resulting in a fast busy tone and failed call. Or when the recipient is on a line, the system receives a "busy" tone. Some embodiments store different statuses such as "busy" vs. "fast busy". When a message fails to be successfully delivered to a recipient, the embodiment makes note of the failure and the reason for the failed delivery. According to the reason for failure and following a set of criteria, the embodiment will attempt to retry message delivery. In some cases the embodiment will not attempt to retry message delivery, such as when the embodiment receives a status of a phone line being disconnected.

Similarly, for email message delivery, some embodiments will detect when a message delivery attempt results in a bounceback message from the recipient's mail server. The embodiment makes note of the email delivery failure and can store the status 238 for later review by the customer 304 that initiated the message delivery. This allows customers to be notified of unreachable recipients or typos in recipient data. Some embodiments also store bounced addresses internally and will not retry them in other jobs for a time period, to keep their SMTP server scores high. Some embodiments store all of the statuses and report the status to the creator 104 of the message via HTTP. A creator of a message would not necessarily have to login to a hub 302 web portal to see status updates or receive reports via email from the hub system. Since other systems can communicate with the hub in some embodiments via a REST API over HTTP, the hub can be configured to communicate with third party systems which can either display the status reports to message creators 104, 304 or send the status reports to message creators.

As to distributed systems, in some embodiments different parts of the system are not centrally located, but are located in different physical locations across one or more states or even one or more countries. Having physical hardware decentralized allows a system to continue operating in the event of a failure at a single physical location. For instance, if a data center in one location experiences a power outage, the system will still be able to reroute any waiting messages through other physical locations. This redundancy allows a system to have excellent uptime and no disruption to the delivery of customers' messages.

Also, a distributed structure allows a system to take advantage of message delivery cost differences nationwide. For example, one embodiment might use a phone provider in state A to make calls to local recipients. However, sometimes the cost to make a call from state B to state A will be cheaper than making a local call from within state A. An embodiment can recognize this lower cost and can dynamically shift message and recipient data from a state A data center over to a state B phone provider in order to take advantage of the cost savings. More generally, some embodiments can analyze cost differences between different message delivery providers 308 and dynamically choose the least cost routing possible for each message to be delivered.

In some embodiments, merge fields 242 can be used at the individual message level, e.g., within a particular message template 246. For example, a message template might look something like this:

"Dear {first-name} {last-name}, please remember your parent-teacher conference will be held {conference-day-date-time} in your student's home room. If you cannot keep this appointment, please call {school-office-phone} to reschedule. Thank you." Merging at the message content level would then produce a final message something like this: "Dear Pat Jackson, please remember your parent-teacher conference will be held Monday, Apr. 14, 2014 at 3:30 pm in your student's home room. If you cannot keep this appointment, please call 800-555-1212 to reschedule. Thank you."

In some embodiments, merge fields 242 can be used at a higher level to define or select a particular message template 246 from a set of message templates; the particular message template may itself contain merge fields, as in the example message template above. A set of message templates may be defined by a customer 304. In some cases, each message template in a set is tailored to a different delivery mode, e.g., one message template for SMS, another for email, a third for push notifications, and a fourth for voice messages. In some cases, each message template in a set is tailored to a different subset of recipients, e.g., one message template for students and their parents, and another for teachers.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A message customization process performed with a communications hub, comprising:

receiving at the hub a messaging job creation request sent over a network connection, the messaging job creation request including a destinations uniform resource locator (URL);

automatically utilizing the destinations URL to obtain via network communication a list of multiple recipient specifiers, each recipient specifier specifying a recipient delivery address and a delivery mode;

obtaining via network communication a list of multiple content specifiers, each content specifier specifying at least a portion of message content to be delivered to at least one recipient;

wherein the recipient specifiers include at least one merge field and corresponding recipient merge value, the content specifiers include at least one merge field also present in the recipient specifiers, process further comprises merging recipient merge values into respective message contents according to the at least one merge field.

2. The process of claim 1, wherein the messaging job creation request includes a contents URL, and the process further comprises automatically utilizing the contents URL to obtain the list of multiple content specifiers.

3. The process of claim 2, wherein the contents URL includes at least one merge field, and the process further comprises:
    merging a content identification merge value into the contents URL to obtain a merged contents URL, the merged contents URL identifying a content specifier location;
    retrieving at least one content specifier from the content specifier location, the content specifier including at least one merge field; and
    merging a recipient merge value into the content specifier merge field.

4. The process of claim 3, wherein the recipient specifiers include at least one merge field and corresponding recipient merge value, the content specifiers include at least one merge field also present in the recipient specifiers, and the process further comprises merging recipient merge values into respective message contents according to the at least one merge field.

5. The process of claim 1, wherein the process further comprises the following sequences performed as part of a single messaging job which was created in response to the job creation request:
    combining content of a first message having a recipient delivery address with content of a second message which has the same recipient delivery address, and then submitting the combined messages for delivery to the recipient delivery address.

6. The process of claim 1, wherein the process further comprises combining content of a first message having a recipient delivery address and a first recipient name with content of a second message which has the same recipient delivery address but a different recipient name, and then submitting the combined messages for delivery to the recipient delivery address.

7. The process of claim 6, wherein the recipient delivery address comprises a telephone number.

8. The process of claim 1, wherein the process further comprises combining content of a first message having a recipient delivery address provided in a first job with content of a second message for which the same recipient delivery address was provided in a different job, and then submitting the combined messages for delivery to the recipient delivery address.

9. The process of claim 1, wherein the process further comprises the following sequence performed as part of a single messaging job which was created in response to the job creation request: avoiding combining two messages to an individual recipient after determining that even though the messages have the same recipient they also have different delivery modes.

10. A computer-readable storage medium configured with data and with instructions that when executed by at least one processor causes the processor(s) to perform a technical process for message customization, the process comprising:
    receiving at a communications hub a messaging job creation request, the messaging job creation request including a destinations uniform resource locator (URL);
    utilizing the destinations URL to obtain a list of multiple recipient specifiers, each recipient specifier specifying a recipient delivery address and a delivery mode; and
    obtaining a list of multiple content specifiers, each content specifier specifying at least a portion of message content to be delivered to at least one recipient;
    wherein the recipient specifiers include at least one merge field and corresponding recipient merge value, the content specifiers include at least one merge field also present in the recipient specifiers, and the process further comprises merging recipient merge values into respective message contents according to the at least one merge field.

11. The configured medium of claim 10, wherein the messaging job creation request includes the destinations URL and a contents URL, the recipient specifiers include at least one merge field and corresponding recipient merge value, the content specifiers include at least one merge field that is also present in the recipient specifiers, and the process further comprises merging recipient merge values into respective message contents according to the at least one merge field.

12. The configured medium of claim 10, wherein the messaging job creation request also includes at least one of the following items:
    a callback URL for the communications hub to use when providing job status information;
    an explicit job start time;
    an explicit job start date;
    an explicit job expiration time;
    an explicit job expiration date;
    an explicit blackout start time;
    an explicit blackout end time; or
    information transmitted using an HTTPS POST command.

13. The configured medium of claim 10, wherein the process further comprises at least one of the following sequences performed as part of a single messaging job which was created in response to the job creation request:
    assembling a first message based on a first message template for delivery according to a first delivery mode, and also assembling a second different message based on a second different message template for delivery according to a second different delivery mode;
    assembling a first subset containing messages based on a first message template for delivery to a first set of recipients, and also assembling a second different subset containing messages based on a second different message template for delivery to a second different set of recipients; or
    assembling a first set of messages for delivery to a first individual recipient, and also assembling a second different set of messages for delivery to a second different individual recipient.

14. The configured medium of claim 13, wherein the process comprises at least two of the sequences, and the job creation request includes a contents URL.

15. The configured medium of claim 10, wherein the process further comprises the following sequence performed as part of a single messaging job which was created in response to the job creation request: combining content of a first message having a recipient delivery address with content of a second message which has the same recipient delivery address, and then submitting the combined messages for delivery to the recipient delivery address.

16. The configured medium of claim 10, wherein the process further comprises avoiding combining two messages to an individual recipient after determining that even though the messages have the same recipient they also have different delivery modes.

17. The configured medium of claim 16, wherein the different delivery modes comprise a telephone call delivery mode and an SMS delivery mode.

18. The configured medium of claim 10, wherein the process further comprises combining content of at least two messages for delivery to a single recipient delivery address.

19. The configured medium of claim 18, wherein the combining occurs no more than five minutes prior to submitting the combined messages to a delivery mode provider for delivery to the recipient delivery address.

20. The configured medium of claim 18, wherein the combining occurs no more than one minute prior to submitting the combined messages to a delivery mode provider for delivery to the recipient delivery address.

21. The configured medium of claim 10, wherein the process further comprises:
   merging a merge value into a contents URL to identify a content specifier location; and
   merging a different merge value into a message template to assemble a message.

22. The configured medium of claim 10, wherein the messaging job creation request includes at least three of the items.

23. The configured medium of claim 10, wherein the messaging job creation request includes at least four of the items.

24. A computer system comprising:
   a logical processor;
   a memory in operable communication with the logical processor;
   a messaging job creator residing in the memory and having code which upon execution with the processor creates a messaging job after receiving a job creation request at least in part by (a) determining a destinations URL is present in the job creation request, (b) automatically utilizing the destinations URL to obtain via network communication a list of multiple recipient specifiers, each recipient specifier specifying a recipient delivery address and a delivery mode, and (c) obtaining a list of multiple content specifiers, each content specifier specifying at least a portion of message content to be delivered to at least one recipient;
   wherein the recipient specifiers include at least one merge field and corresponding recipient merge value, the content specifiers include at least one merge field also present in the recipient specifiers, and upon execution code of the system merges recipient merge values into respective message contents according to the at least one merge field.

25. The system of claim 24, wherein the system further comprises the job creation request residing in the memory, and the job creation request includes at least three of the following items:
   a callback URL to use when providing job status information;
   an explicit job start time;
   an explicit job start date;
   an explicit job expiration time;
   an explicit job expiration date;
   information transmitted using an HTTPS POST command;
   an inline contents list containing content specifiers;
   an inline destinations list containing recipient specifiers; or
   an inline list containing merge fields.

26. The system of claim 25, wherein the job creation request includes an inline list containing merge fields, and also includes at least four of the other items.

27. The system of claim 24, wherein the system further comprises at least one of the following:
   messaging job creator code which upon execution merges a recipient merge value into message content according to a merge field;
   messaging job creator code which upon execution merges a content identification merge value into a contents URL to obtain a content specifier location.

28. The system of claim 24, wherein the system further comprises the job creation request residing in the memory, and the job creation request includes a destinations URL and a contents URL.

29. The system of claim 24, wherein the system further comprises message combining code which upon execution determines whether to combine content of a first message with content of a second message based on at least recipient delivery address(es) and delivery mode(s).

30. The system of claim 24, wherein the system further comprises message combining code which upon execution determines whether to combine content of a first message with content of a second message based on at least a recipient delivery mode preference.

* * * * *